April 4, 1944.　　　R. D. JOHNSON　　　2,346,030
MULTIPLE CONTROL DEVICE FOR TABS AND THE LIKE
Filed May 21, 1941　　　3 Sheets-Sheet 1
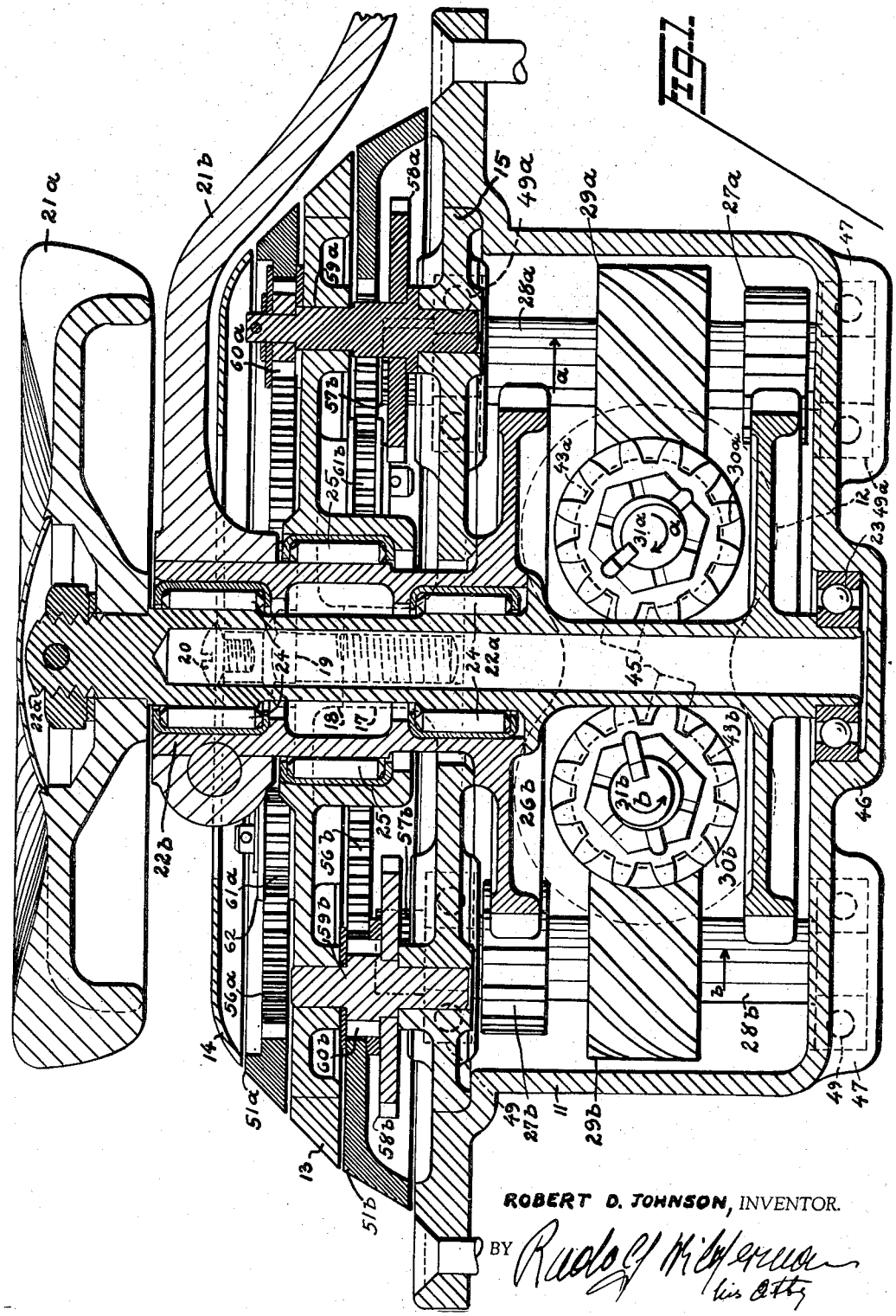
ROBERT D. JOHNSON, INVENTOR.

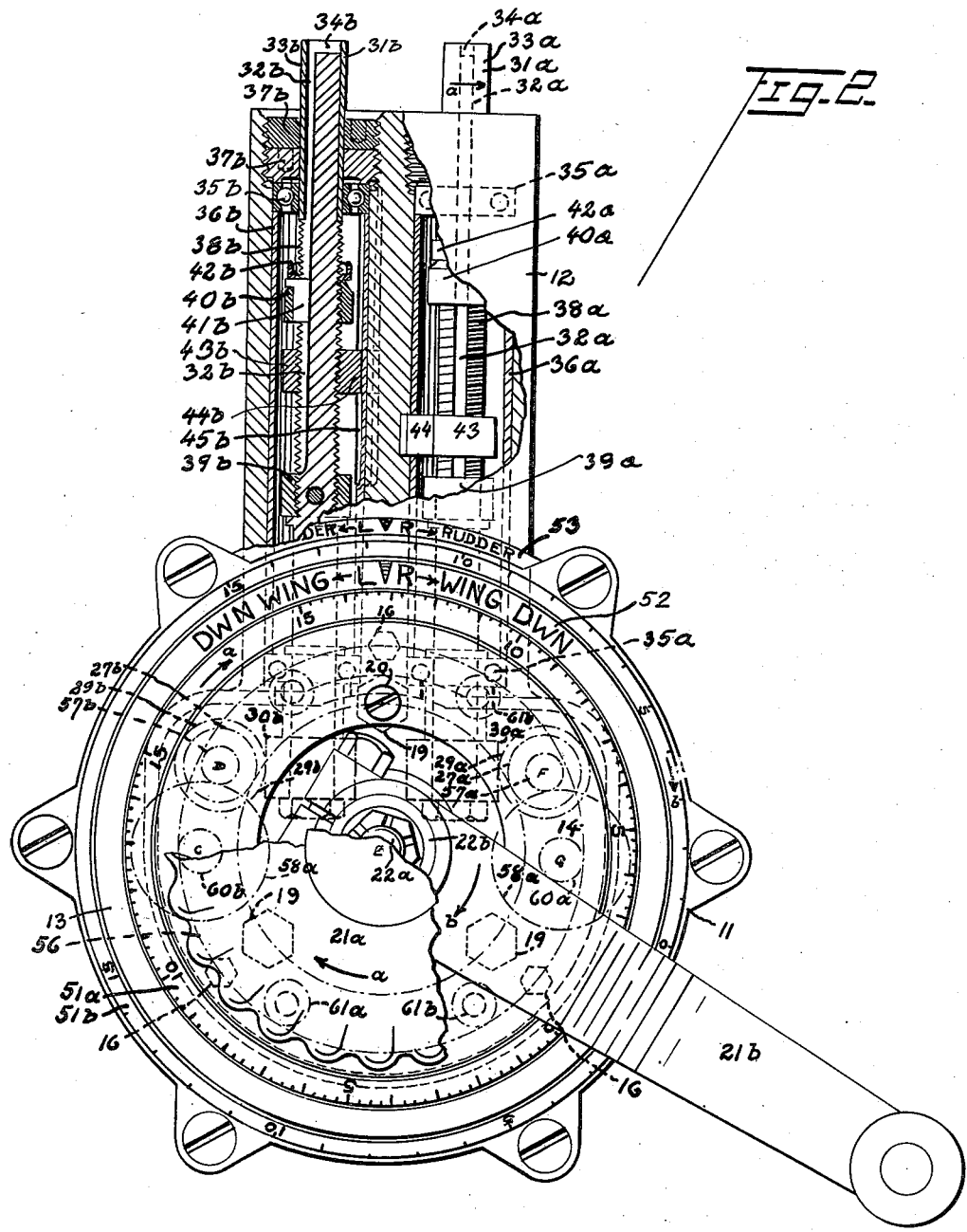

April 4, 1944.  R. D. JOHNSON  2,346,030
MULTIPLE CONTROL DEVICE FOR TABS AND THE LIKE
Filed May 21, 1941  3 Sheets-Sheet 3
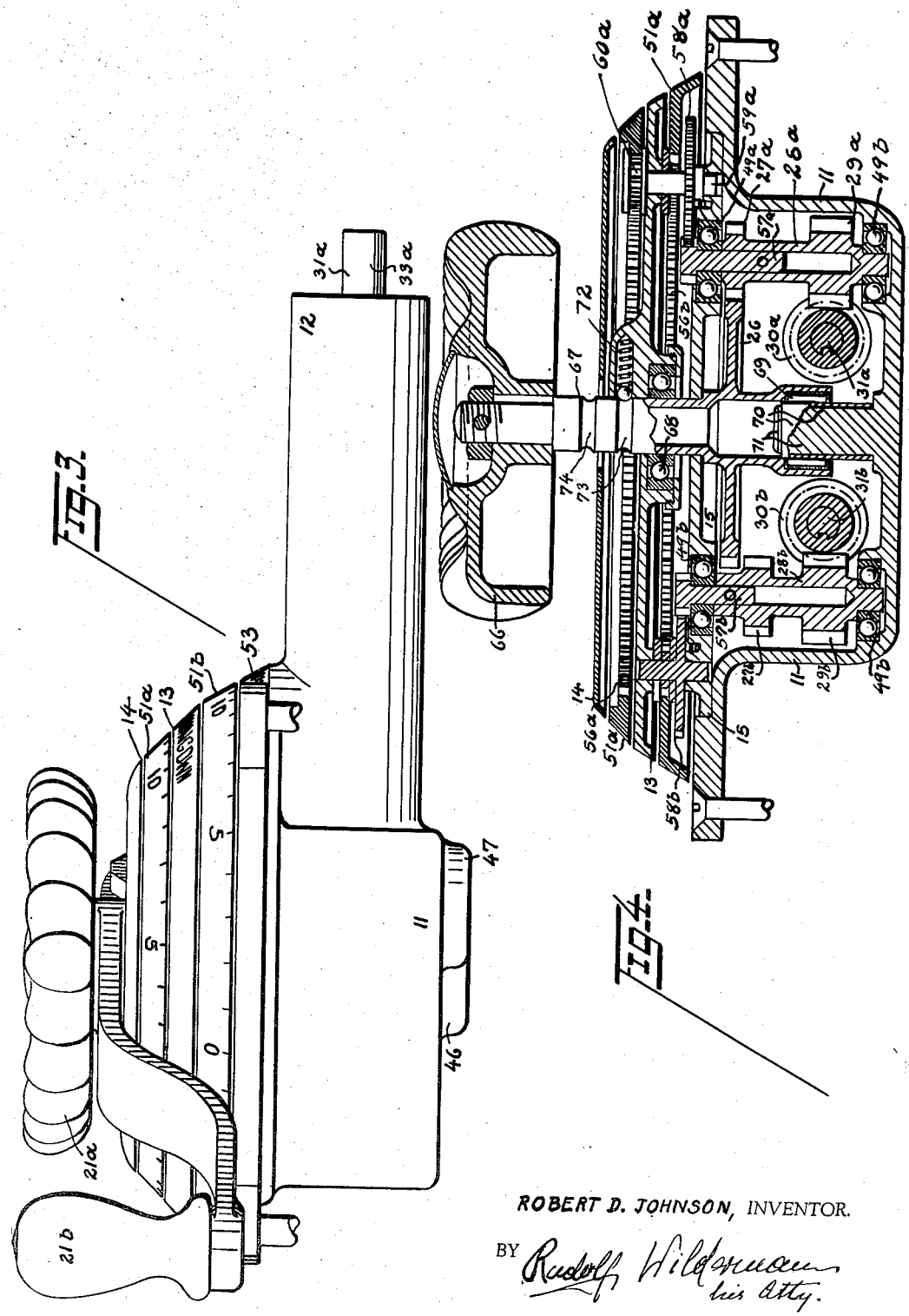
ROBERT D. JOHNSON, INVENTOR.
BY Rudolf Wildman
his Atty.

Patented Apr. 4, 1944

2,346,030

UNITED STATES PATENT OFFICE 2,346,030

MULTIPLE CONTROL DEVICE FOR TABS AND THE LIKE

Robert D. Johnson, New Brunswick, N. J., assignor to Atlantic Diesel Corporation, a corporation of New Jersey Application May 21, 1941, Serial No. 394,566

19 Claims. (Cl. 74—10)

This invention concerns a device for multiple mechanical control. More particularly it applies, where two or more independent control operations are to be carried out at a control point and where for purposes of convenience or compactness, and especially for purposes of economy in space and weight, such control means are to be superimposed upon each other in a single control unit. The control unit is to combine the various controls by way of concentrically disposed control means, and indicators are to be provided, likewise in concentricity with the control means, and are to permit observation of the exercised control.

Generally speaking, such control devices are not new. But when the problem arose of applying such device for tab control on airplanes, it was learned that the devices of the prior art lack economy in arrangement, accuracy and reliability to such an extent, that they are not practical and that a comprehensive reorganization is necessary in order to convert such a device for exacting requirements, i. e. in the nature stated. The invention therefore concerns such a reorganized improvement, which is well suited, more particularly by reason of its simplicity and ruggedness, wherever the said type of control is desired.

It is one object of this invention to eliminate the complicated mechanism and the great amount of gearing previously used in devices of this kind.

It is another object of this invention to accomplish the desired results by ordinary or "standard" gearing, i. e. gearing of the type most frequently used and of the type that readily may be made by ordinary tools of a well equipped machine shop.

According to a further object of this invention the organization of the device thereof is to be such that the play between parts will be limited to a minimum. Furthermore the arrangement is to provide, that changes of ratios, of the control ranges, of relative directions of rotation and speed may be effected by simple rearrangement or replacement of parts. The arrangement is also to be such that the transmission to the parts controlled may extend in one or more directions from the control unit, and that, if so preferred, the transmission elements may extend level alongside of each other, e. g. laterally away from the control unit.

The invention is also to provide for a handle or handles, which may each serve a plurality of the controls desired, being for instance shifted for such purpose.

Finally the invention contemplates the coordination of parts in such manner, that the control unit is easy to assemble and to take apart.

These and other objects of this invention, some of which will be better understood from the following detailed description, are obtainable by the embodiment, and a modification thereof, shown in the accompanying drawings, which, together with the following description, are submitted for purposes of illustration of the invention, but not in limitation thereof.

In the drawings:

Fig. 1 is a transverse cross-sectional view taken centrally through the axis concentric control shafting of an embodiment of this invention, the view being taken in the direction in which the transmissions extend away from the control unit. The scale of this view is enlarged in comparison with that of the other figures herein presented.

Fig. 2 is a corresponding, partly sectioned top view, the crank being slightly angularly shifted relatively to the position of Fig. 1.

Fig. 3 is a corresponding side view.

Fig. 4 shows a slightly modified embodiment of this invention in a cross-section generally corresponding to that of Fig. 1, except that the principal control gearing in the main portion is swung into one plane, the view being thus expanded, so to speak, by extending the section, under preservation of center distances, along the connecting lines of the centers C, D, E, F and G in Fig. 1.

Similar numerals refer to similar, and at times only corresponding parts throughout the various views:

The embodiments of the drawing exemplarily show the control unit to be adapted for dual control only, and corresponding parts of the two independently operable controls are correspondingly numbered but are distinguished from each other by the suffixes a and b. These suffixes are also applied to arrows shown on the surfaces of parts and indicating the direction of rotation, all such arrows applying in the instance of each control only to the rotation occasioned by actuating the control means in one direction of rotation.

The particular embodiments shown in the drawings and the respective legends are exemplarily directed to the tab control in an airplane. Present day large planes may provide tabs, as auxiliary ailerons as auxiliary rudders, etc., or the tabs may be incorporated in the ailerons, rudder, etc., such tabs being independently controlled, for purposes of predeterminedly contracting a deviation from a normal balance caused by an uneven distribution of weight, the idleness of one set of propellers and motors, an uneven condition of wind resistance, and the like. Such tabs allow the pilot to establish a state of balance under conditions which would more or less continuously offset the normal balance so that he may use his immediate control means in a normal manner, whereas in the absence of a tab those immediate controls would have to be mainipulated under continuous consideration of whatever throws the plane out of balance.

Such tabs are to be reset from time to time and are usually steadied at or near the tabs by worm gearing, and the gear ratio between tab and control handle is such, that the tab may be accurately and easily reset, as circumstances may require. Such a tab control device is frequently suspended so that the axis of control extends down. Such mounting will herein be considered as up-side-down position, i. e. the description and drawings show and refer to a handle or handles extending to the top of the device, whereas the control and the indicating means may face down in use.

Furthermore the transmission connecting the control unit to the tabs will normally extend from the unit towards the operator, so that the side of the housing 11, on which it has the extension 12 accommodating the transmission or connections for transmission will hereinafter be referred to as the front of the unit or device.

In addition to housing 11 a circular insert 12 countersunk in the housing 11, an elevated platform 13 and a cover plate 14 are elements constituting the stationary part of the frame of the unit.

Insert 15 fits a recess of the housing 11 and is secured by screws 16 in position. Spacing lugs 17 and 18 extending up and down from the insert 15 and the platform 13, respectively, offer a three-corner support for keeping the insert and platform apart, and the hexagon head screws 19 secure these parts in their spaced relationship. Furthermore dowels (not shown) may be provided for an exact positioning of these parts on each other.

The cover plate 14 rests upon upward extensions of the screws 19 and is fastened thereon by flat head screws 20.

In the embodiment of Figs. 1, 2 and 3, the handles for dual control are differentiated as a knob 21a and a crank 21b, the former being attached by a castellated nut upon the upper end of shaft 22a, whereas the latter is clamped around the upper end of the concentric sleeve shaft 22b.

The lower end of inner shaft 22a is rotatably seated in the housing by a ball bearing 23, which is countersunk and mounted in a depression 46 of the bottom of housing 11. Further up the inner shaft 22a is journalled in the concentric sleeve shaft 22b by a pair of roller bearings 24 inserted from the upper end and from the lower end into sleeve shaft 22b, respectively. Sleeve shaft 22b in turn is rotatably supported by a roller bearing 25 centrally mounted in a large hub of the elevated platform 13, so that the two handles 21a and 21b may freely rotate the inner and outer shaft 22a and 22b relatively to each other as well as to the frame 11, 13, 14 and 15.

Each one of the shafts 22a and 22b comprises a large spur gear 26 at its lower end. These spur gears are respectively meshed upon the pinions 27a and 27b forming part of the vertical shafts 28a and 28b. The latter are mounted further to the front in the housing, in a substantially symmetrical arrangement. Shafts 28 are mounted in the housing by way of ball bearings 49 lodged in depressions 47 in the bottom of the housing below, and in the circular insert 15 above. Between these mountings each of the shafts 28 comprises a helical gear formation 29. Similar helical gears 30 are mounted upon the rear ends of symmetrically arranged transmission shafts 31, which project from the front, i. e. from the extension 12, into the housing 11 proper. These gears 30 mesh with the gears 29, so that an offset, rectangular drive is provided to connect the inner and outer shafts 22a and 22b with the transmission shafts 31a and 31b, respectively. These two shafts have feather-keyways 32, over which extend, near the outer ends of said shafts, the sleeves 33. At the front end of the shaft the feather-keyways are extended at 34 across the shaft, thus providing means for an endwise key-coupling adapted for connection to transmission shafts leading to the tabs.

Thus the shafts 31 and the tabs connected thereto may be independently controlled by knob 21a and by crank 21b. The arrangement shown shows a step-up in gearing selected in the particular instance of airplane tab control because the transmission may provide between the control unit and the respective shaft a worm gear connection involving a step-down in gear ratio.

The transmission shafts 31 are mounted in two large bores in the extension 12 by pairs of ball bearings 35, which are relatively spaced in each instance by a sleeve 36, nuts 37 in the threaded end of the bores keeping the mounting in position.

Tabs usually have a normal, central or neutral position, in which they are ineffective. From such neutral position they may be adjusted up and down in connection with aileron tabs or sideways in connection with rudder tabs, in opposite directions, thus providing an overall range of adjustment in both directions relatively to the normal or neutral position. In order to restrict the control to a movement within the desired range. the following arrangement is shown:

In the two chambers provided by the spacing sleeves 36 in extension 12 a portion of transmission shafts 31 is threaded up to sleeves 33, said sleeves taking the place of the thread where the shafts are journalled at their front ends. Against flanges formed on the shafts at the rear ends of the threads 38 the stop nuts 39 are permanently seated, e. g. pinned onto the shafts. The threaded portions 38 extending from these stop nuts 39 are adjustable in effective length by check nuts 40, which are set at a predetermined longitudinal position on shafts 31 by keys 41 engaged therein and upon the feather-keyways 32. Keys 41 and nuts 40 in turn are secured in position by the lock nuts 42.

Between nuts 39 and 40 the threaded portions of the shafts 31 accommodate the tapped lugs 43, which have—in order to prevent rotation—keys 44 extending through clearance slot in spacing sleeve 36 into feather-keyways 45 in extension 12. The keyways 45 extend towards each other, but at an offset, so as not unduly to weaken the central portion of extension 12. As control is exercised by one or the other of the handles of the dual control, the respective lug 43 will travel back or forth upon the respective shaft 31, such travelling of the lugs 43 being checked in opposite directions by the nuts 39 and 40, and check nut 40 may be reset in order to limit this range of travel of lug 43 corresponding to the desired range of tab movement. Since, by way of example, a few more turns of control revolutions are required for the aileron tab than for the rudder tab, nuts 39a and 40a are correspondingly farther set apart than nuts 39b and 40b.

The parts so far described serve for the actual tab control to be exercised by the pilot. As the pilot desires, from time to time, a change in the setting of the tab, he may manipulate knob 21a for control of an aileron tab, or crank 21b for control of rudder tab.

But the device should also, in order to be complete, permit the pilot to tell at a glance the approximate position at which the tabs are set. For such purpose tell-tale means, or indicators are provided, which show to the pilot right on the control unit, to what position the tabs controlled by the units are adjusted:

A revolving dial 51 is coordinated to each of the controls of the control units, each dial showing a zero point corresponding to a neutral position of the respective tab, and being calibrated in opposite directions from such zero position to cover the opposite ranges of play of the tab, the respective ranges being, for instance, each marked in a fifteen-division.

The fixed marks 52, to which the dials 51 may be related, are provided upon the rim of platform 13 and upon the top flange of housing 11 at 53, respectively. Legends to the left and right of said marks 52 serve to tell the pilot in which direction the dials are to be moved relatively to these marks, in order to swing down the aileron tabs of the left wing or of the right wing, or to swing a rudder tab to the left or to the right, respectively. The graduated dials and the fixed parts bear the marks and legends at a slant in order to render the markings visible to the front of the control unit as well as from below, when the device or unit is suspended in an upside-down position.

The dials are to pass, of course, through only one revolution or less, while the controls are rotated through the respective ranges. The reducing gearing to connect the previously described mechanism to the dials is as follows:

Each dial 51 is integral with an internal gear 56, the internal gears 56a and 56b, like in the case of all other gearings hereindescribed, being for instance alike.

Each of the shafts 28 may then be provided with an extension gear above its upper support, to mesh and to engage directly upon one of the internal gears 56. But if there is to be a provision for a higher or more readily changeable gear ratio, an intermediate gear shaft may be interposed, as shown.

Above the respective upper ball bearing 49 each of the shafts 28 has a pinion extension 57 which is for instance inserted into and secured to said shaft. The pinion extensions 57 engage with the gears 58, which are mounted on vertical shafts 59. These shafts 59 are journalled in the insert 15 and the platform 13 upon opposite sides of the central inner and outer shafts. Shaft 59b has the pinion formation 60b which meshes with the internal gear 56b. A similar pinion 58a is mounted on the shaft 59a above platform 13a and meshes with internal gear 56a. The gear ratios are shown to be alike for each control. A wider range of play being however provided in connection with lug 43a than with lug 43b, the graduations of dial 51a extend over a corresponding larger sector than those of dial 51b. The problem of supporting the dials 51 is taken care of as follows:

Idler pinions 61, which are similar to pinions 60, are triangularly arranged relatively to the pinion 60, and are supported above or below the platform 13, in connection with gears 56a and 56b, respectively. Like the pinions 60 the idler pinions 61 are provided with flanges 62 above and below, or there may be separate washers for such purpose, which endwise determine the level at which the dials 51 are supported. Since the whole gearing is not intended for a continuous drive, but merely for occasional adjustment, it is furthermore in order to provide a close fit between the teeth of meshing gears, so that the idler pinions 61 together with the respective pinion formations or pinions 60 offer radially also a support for the dials 51a and 51b, said dials being thus rotatably suspended between the cover plate 14 and the platform 13 and the platform 13 and the top of housing 11, respectively.

The number of revolutions being known which the end of the transmission shaft to be connected to the control units have to make in order to swing a tab through its desired range of regulation, nuts 40 are set upon the respective shafts, so those shafts pass through that same number of revolutions while lug 43 travels from abutment with nut 30 into abutment with nut 40, respectively. If the neutral position of the tab corresponds to a halfway position of a range of desired control, the dials 51 are adjusted so that their zero points register with marks 52, when the lugs 43 are in their halfway position of travel. If so desired, the graduations of the dials may be correspondingly adjusted. If the neutral position of a tab is at another point of its angular range of movement—i. e. not its medium position,—the setting of the control units may be correspondingly modified.

The control unit having thus been set, it is coupled to the transmission shafts of the tabs, when the tabs are in a neutral position and the dials show the zero position. Now the pilot may place the aileron tabs into any desired position by manipulation of knob 21a, and he may swing the rudder tab or tabs into a preferred angular position by manipulating crank 21b, the angular tab adjustments thus effected being registered on the control units by the dials 51 in their relation to the pointers or fixed marks 52.

The particular arrangement of the device described is such, that upon clockwise rotation of the knob and of the crank, the transmission shafts 31, seen from the top, rotate oppositely and away from each other. Rotation of knob or crank in the opposite direction will rotate transmission shaft 31a or transmission shaft 31b in a direction opposite to that indicated by the arrows.

If upon clockwise rotation of knob and crank the transmission shaft 31, as seen from the top, are to move oppositely towards each other, that is effected by replacing the right hand helical gears 29 and 30 by left hand helical gears. Or, if the transmission shafts 31a and 31b are to rotate in the same sense when knob and crank are both rotated in the same direction, a pair of right hand helical gears is used for one of the pairs of helical gears 29a, 30a and 29b, 30b, whereas the other one of the pairs is a left hand set.

While the mechanism is shown to be substantially symmetrical for both controls, it is readily understood, that the gear ratios assigned to the two controls, respectively, may be changed at random and independently, i. e. each one of the dual controls is subject to adjustments which do not affect the other control.

However, if the gear ratio of the spur gears 26 or 27 is to be the same for both controls, or at least the same large spur gear 26 is to be used in both instances, only one such large spur gear 26 is necessary on one main shaft, if such main shaft or spur gear is arranged to be shiftable between positions in which it either registers with pinion 27a or 27b. This is illustrated in Fig. 4. Aside from placing pinions 27a and 27b upon the same side of helical gears 30a and 30b and from providing a single handle 66 for both controls on the common control shaft 67, the arrangement is substantially the same as explained in connection with the embodiment of Figs. 1–3.

The arrangement in Fig. 4 also shows, that the handle 66 on control shaft 67 may be manipulated by reciprocation in an axial direction, in order to effect the desired gear train. The handle and shaft 66, 67 are shown in a top position, in which gear 26 engages pinion 27a. But shaft 67 may be slid down in the inner race of ball bearing 68 which supports its upper end in elevated platform 13, and the roller bearing 69 mounted in the lower end of the bore of shaft 67 will slide down upon a sleeve 70 covering an arbor 71 arising centrally in housing 11 from the bottom thereof.

A ball check 72 mounted in platform 13 engages in a ball groove 73 of shaft 77, when handle and shaft 66, 67 are in an elevated position. The shaft 67 shows another ball groove 74 above. When the handle and shaft 66, 67 are depressed, so that the ball check 72 engages in the upper ball groove 74 the spur gear 26 shifts from mesh with pinion 27a into mesh with pinion 27b. In thus shifting the pilot changes from an aileron tab control to a rudder tab control position, and of course such position is again reversed, when handle and shaft 66, 67 are lifted back in the position shown in Fig. 4, shaft 67 sliding now up in ball bearing 68 and sliding up with roller bearing 69 on sleeve 70. In either one of these positions the respective tab control may be exercised in exactly the same manner as described in connection with the embodiment of Figs. 1–3.

In the view designated as Fig. 4 those portions of the mechanism which do not fall within the expanded cross-section thereof are not shown, but they may be substantially the same as those shown in connection with the embodiments of Figs. 1–3.

Choice of the materials to be used for the various parts of the mechanisms of the two embodiments shown lies within the discretion of the experienced designer. The arrangements shown are however particularly suited for execution in the light metals and plastics preferably used in the aeroplane industry, if the control device is to be applied for tab control in the manner herein shown.

Having thus described my invention by way of two embodiments, I do not wish to be limited thereby, except as the state of the art and the appended claims may require, for it is obvious that various modifications and changes may be made in the form of the embodiments of my invention, without departing from the spirit and scope thereof.

What I claim is:

1. A multiple device for controlling tabs on an airplane and comprising a housing, a plurality of concentric, rotatable dials on said housing, manual control means superimposed upon said dials, a plurality of rotatable transmission couplings issuing from said housing, and gear units driven by said control means and each operatively connecting one of said dials with one of said couplings.

2. A multiple unit controlling tabs on an airplane and comprising a housing, a plurality of rotatable dials on said housing, manual control means concentrically superimposed upon said dials, a plurality of rotatable transmission couplings issuing from said housing, and gearing shafts gearedly driven by said control means and each operatively connecting one of said dials with one of said couplings.

3. A device for multiple control comprising a housing, a plurality of rotatable dials on said housing, concentric manual control means superimposed upon said housing, a plurality of rotatable transmission couplings laterally issuing from said housing, and gear units driven by said control means and each operatively connecting one of said dials with one of said couplings.

4. A device for multiple control comprising a housing, concentric, rotatable dials on said housing, manual control means superimposed upon said dials, a plurality of rotatable transmission couplings issuing from said housing, gear shafts mounted in said housing parallel with said dials and means, and gearing connecting said shafts to said means, to said couplings and with said dials.

5. A device for multiple control comprising a housing, concentric rotatable dials on said housing, concentric manual control means on said housing, a plurality of rotatable transmission couplings issuing from said housing in a common plane normal to the axis of said control means, and gearing operatively connecting each coupling and each dial with one of said control means.

6. A device for multiple control comprising a housing, a plurality of rotatable dials on said housing, a single manual control means superimposed upon said housing, a plurality of rotatable transmission couplings issuing from said housing, and gearing operatively connecting each coupling with one of said dials and selectively with said control means.

7. A device for multiple control comprising a housing, a plurality of concentric rotatable dials on said housing, manual control means superimposed upon said dials, a plurality of rotatable transmission couplings issuing from said housing by way of parallel shafts and each operatively connected with one of said dials, and helical gears connecting said control means with said couplings at an offset.

8. A device for angularly controlling spaced shafts and comprising a housing, a plurality of concentric, rotatable dials on said housing, manual control means superimposed upon said dials, a plurality of rotatable transmission couplings issuing from said housing onto the shafts to be controlled and each operatively connected with one of said dials, and helical gears connecting said control means with said couplings.

9. A device for multiple control comprising a housing, a plurality of rotatable dials superimposed upon said housing, a plurality of rotatable, manual control means concentrically mounted on said housing, a plurality of rotatable transmission couplings issuing from said housing, and helical gearing operatively connecting each coupling with a dial and with a control means.

10. A multiple control unit comprising a housing, a pair of concentric rotatable dials upon said housing, a pair of transmission shafts extending laterally from said housing, sets of helical gears each connecting one of said dials with one of said shafts, and manual means for individual control of said sets concentrically superimposed upon said dials and operatively connected with said sets.

11. A multiple control unit comprising a housing, a pair of concentric rotatable dials upon said housing, a pair of transmission shafts extending laterally from said housing, a crank superimposed upon said dials, gearing connecting said crank with one of said dials and with one of said shafts, a knob superimposed upon said crank, and helical gearing connecting said knob with the other one of said dials and the other one of said shafts.

12. A multiple control unit comprising a housing, a pair of concentric rotatable dials upon said housing, a pair of transmission shafts extending laterally from said housing, sets of gears each connecting one of said dials with one of said shafts, a shift gear operatively connected with said sets of gears for alternative actuation of said sets, and a control handle superimposed upon said dials and operatively connected with said shift gear.

13. A multiple control unit comprising a housing, a pair of concentric rotatable dials upon said housing, a pair of transmission shafts extending laterally from said housing, sets of gears each connecting one of said dials with one of said shafts, a shift gear operatively connected with said sets of gears for alternative actuation of said sets, and a control handle superimposed upon said dials and connected to said shift gear.

14. A unit for centralized individual control of parallel transmission shafts, comprising manual control means and dials mounted to rotate around an axis interposed between the transmission shafts, gear shafts each geardly connected to one of the transmission shafts in symmetry with each other respective to a plane extending through said axis parallel to the transmission shafts, and spur gears connecting each of said gear shafts with said means and with one of said dials.

15. A device for multiple control comprising a housing, concentric dials on said housing, manual control means superimposed upon said dials, and gearing in said housing connecting each of said dials with one of said control means.

16. A device for multiple control comprising a housing, concentric dials on said housing, manual control means superimposed upon said dials, gearing in said housing connecting each of said dials with one of said control means, and risers extending from said housing and spacedly supporting said dials.

17. A device for multiple control comprising a housing, concentric dials on said housing, manual control means superimposed upon said dials, and gear shafts arising from said housing and each operatively connecting one of said dials with one of said control means.

18. A device for multiple control comprising a housing, concentric dials on said housing, manual control means superimposed upon said dials, and gear shafts arising from said housing and each adapted for operative connection with said control means and operatively connected with one of said dials.

19. A device for multiple control comprising a housing, concentric dials on said housing, manual control means superimposed upon said dials, gear shafts arising from said housing and each adapted for operative connection with said control means, and an internal gear formation on each of said dials and in meshed engagement with one of said gear shafts.

ROBERT D. JOHNSON.